United States Patent Office 3,230,171
Patented Jan. 18, 1966

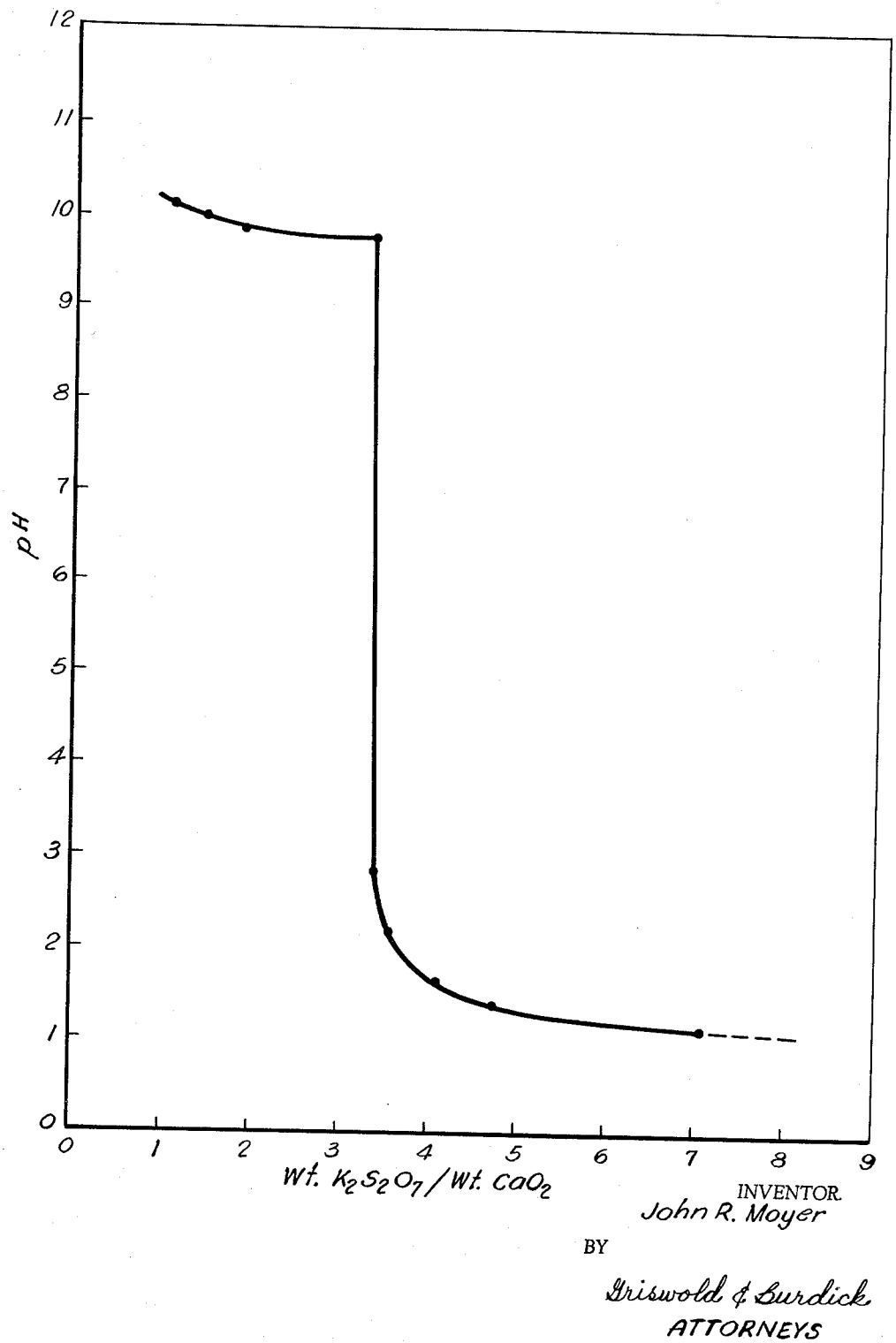

3,230,171
BLEACHING COMPOSITION
John R. Moyer, Midland, Mich., assignor to The Dow Chemical Company, Midland, Mich., a corporation of Delaware
Filed Mar. 4, 1963, Ser. No. 262,511
4 Claims. (Cl. 252—95)

This invention relates to bleaching and more particularly relates to a novel bleaching composition containing calcium peroxide, and to a process using said composition.

In the bleaching industry aqueous hydrogen peroxide is used to a great extent as the bleaching agent in processes employing peroxides. Sodium peroxide is also used extensively in these processes as a peroxygen source. Normally, hydrogen peroxide is shipped and stored in carboy containers as a dilute aqueous solution thereof. Storage is usually held to a minimum because hydrogen peroxide tends to decompose at a fairly rapid rate. Much more serious, however, with respect to the shipping and storage of hydrogen peroxide, is the hazard represented by its highly corrosive and spontaneously flammable nature. For example, a 10 percent aqueous solution of hydrogen peroxide represents a corrosion hazard to handling personnel; above a 50 percent concentration it is spontaneously flammable, at a 90 percent concentration it can be detonated by contact with dust. Particular care, therefore, must be exercised in storing, handling and using hydrogen peroxide.

Sodium peroxide on the other hand is a dry solid but is thermally unstable losing a significant portion of its peroxygen value on prolonged storage through decomposition. In addition, sodium peroxide, as with hydrogen peroxide, tends to be corrosive to personnel and to many materials with which it would normally come into contact. The handling and storage qualities of sodium peroxide, therefore, are also limited and care must be exercised in its use.

Calcium peroxide, however, though its utility heretofore with respect to the bleaching industry having been limited due to its substantial insolubility in water, is a free flowing solid having a greater thermal stability than sodium peroxide both in short and prolonged storage, is non-corrosive to handling personnel, and to the materials it is likely to contact. In addition, calcium peroxide in the usual commercial grades (75% calcium peroxide) being anhydrous, is more economically transported in that it contains a greater peroxygen value per unit weight than that of commercial dilute aqueous hydrogen peroxide, which has a weight concentration of about 35 percent.

In view of the desirable properties of calcium peroxide as described above, it would be very desirable, therefore, to employ calcium peroxide as the peroxygen source in a bleaching composition.

The object of the present invention, therefore, is to provide a solid free flowing bleaching composition employing calcium peroxide as the peroxygen source, which is stable upon prolonged storage, non-toxic in ordinary usage, and non-corrosive.

A further object of the invention is to provide a solid bleaching composition employing calcium peroxide such that when employed in an aqueous mixture a substantially complete release of its peroxygen value is obtained.

Another object is to provide a process for bleaching using a bleaching composition employing calcium peroxide as the peroxygen source.

The above and other objects and advantages have been found obtainable in accordance with the invention by admixing calcium peroxide with potassium pyrosulfate in particular proportions to one another to form a novel bleaching composition such that when said composition is mixed with water a complete release of its peroxygen value is obtained, and made available for bleaching purposes, if desired. This so-prepared composition now permits the advantageous use of calcium peroxide and its many desirable properties while circumventing its insolubility in water, and provides utility with respect to bleaching with calcium peroxide heretofore unknown.

The bleaching composition of the present invention is prepared by admixing potassium pyrosulfate with calcium peroxide in a weight ratio, that is, the ratio of the weight of potassium pyrosulfate to that of calcium peroxide, within the range of from about 3.5 to about 7.5, the mixture so obtained providing a pH of from about 3 to about 1 when mixed with water. The amount of water used is not sharply critical but is generally dependent upon the material to be bleached. The solid components can be made into a paste with water, as for use on wooden surfaces, or enough water can be used to make a slurry containing more or less undissolved pyrosulfate and calcium sulfate, as will appear later from the stoichiometry. Still more water may be used if it is desired to obtain a lesser amount of undissolved matter in the aqueous bleaching composition. If particular care is exercised in adding the composition to water, an aqueous mixture having a pH of from about 9.5 to about 3 can be obtained using a weight ratio of from about 3.4 to about 3.5 with various amounts of water, for example from 1 to 250 parts of water per part of the dry mixture. Adjustments to obtain the desired pH value in this range are normally and more easily accomplished by the addition to the aqueous mixture of small amounts of either a standard base, e.g., sodium hydroxide, or acid, e.g., hydrochloric acid.

At a pH of 9.5 and below a substantially complete release of the peroxygen value of the calcium peroxide is obtained. Above a pH of 9.5, however, there is a significant reduction in the peroxygen release. The weight ratios required to obtain the desired pH within the above range are easily determined by reference to the graph in the annexed drawing.

In the drawing, the graph is a plot of the pH values obtained in the aqueous mixtures of potassium pyrosulfate and calcium peroxide in the weight ratios shown.

In obtaining the pH values plotted on the graph 100 milliliters of water was used in each case in making various aqueous slurries. The slurries were prepared by adding to the water in each case 1 gram of 75 percent pure calcium peroxide and an amount of potassium pyrosulfate to give the weight ratio of pyrosulfate to peroxide represented by the heavy points on the graph in the appended drawing. A pH determination of each of the so-prepared aqueous mixtures was made using a Beckman glass electrode with a calomel reference electrode in combination with a Leads and Northrup pH indicator. In addition, the peroxygen value of each mixture was determined iodometrically using starch as an indicator. In the mixtures which registered pH values below 9.5 a complete release of the peroxygen value of the calcium peroxide was noted, whereas in the mixtures having a pH above 9.5 the release of peroxygen was reduced as the pH increased.

A particular advantage of the present bleaching composition is that the aqueous bleaching mixture prepared may have a pH of not greater than 3 if desired. Materials such as wool fibers, naphthol-dyed goods, and acetate rayon can be effectively bleached with such an acidic composition, whereas, an alkaline medium has a detrimental effect on these materials.

In a bleaching operation employing the composition of the present invention, an aqueous mixture of potassium pyrosulfate and calcium peroxide is prepared in which sired pH applicable to the material being bleached. The mixture is dissolved in enough water to provide the desired pH applicable to the material being bleached. The material intended to be bleached is then contacted with said aqueous solution for a time sufficient to obtain the desired degree of bleaching, followed by removing the so-bleached material from the aqueous solution and rinsing.

The potassium pyrosulfate ingredient of the bleaching composition constituting the present invention provides in solution by hydrolysis the acid needed to form hydrogen peroxide, the actual bleaching agent, from the calcium peroxide ingredient according to the following reaction:

$$CaO_2 + K_2S_2O_7 + H_2O = CaSO_4 + H_2O_2 + K_2SO_4$$

Sodium pyrosulfate may be used, for example, as an effective substitute for potassium pyrosulfate if the composition is to be mixed with water for bleaching relatively soon after it is prepared.

Other acid forming substances may be employed in the bleaching composition of the invention as an acid source to obtain hydrogen peroxide in solution, provided, however, it produces with calcium peroxide in an aqueous mixture the desired pH and does not in the dry composition react with or promote the decomposition of the calcium peroxide. Potassium pyrosulfate is particularly suited as an acid source in the dry composition because it is stable upon prolonged storage and does not react with or promote the decomposition of dry calcium peroxide.

If substantially pure calcium peroxide is employed in the bleaching composition of the present invention, the weight ratios of potassium pyrosulfate to calcium peroxide as used in obtaining the points on the aforementioned graph will be substantially the same as those using commercially pure materials and will require only slight modification, as determined by testing, to produce the pH in solution as indicated in the graph. For example, it was found that a weight ratio of about 3.5 using commercially available calcium peroxide need only be increased to about 3.53 when the substantially pure peroxide is employed.

To further illustrate the utility of the present invention as applied to bleaching wool cloth, two aqueous bleaching mixtures were prepared in accordance herewith, each having the composition as indicated in Table I and a pH within the range of from about 7 to about 3. Adjustments to obtain the desired pH values within this range were made, for convenience, by the addition to said aqueous mixtures small amounts of either 0.1 N NaOH or 0.1 N HCl. A piece of unbleached wool cloth was immersed in each of the so-prepared aqueous mixtures, maintained at a temperature of about 40° C., for 5 minutes, wrung dry without rinsing, and then dried for about 45 minutes at 100° C. The brightness of each of the so-bleached pieces was next determined by using a Photovolt Reflectometer with a Hunter green tri-stimulus filter, with MgO as a standard with a percent brightness of 100. The results of these tests are recorded in Table I below.

In addition, as blanks for comparison purposes, two aqueous hydrogen peroxide solutions were prepared equivalent in released peroxygen value to the above two aqueous mixtures prepared under the present invention. Pieces of wool of the same grade and type as above were also bleached using the same procedure and under the same conditions and tested for brightness, with the results also recorded in Table I.

As a further comparison, a piece of the unbleached wool cloth was tested for brightness and the result recorded in Table I below.

Table I

| Example | Composition | | | | Ratio at $CaO_2$ to $K_2S_2O_7$ | pH[3] | Brightness, percent[4] |
| --- | --- | --- | --- | --- | --- | --- | --- |
| | $H_2O$, g. | $H_2O_2$, ml.[1] | $CaO_2$, g.[2] | $K_2S_2O_7$, g. | | | |
| (Blank) | 500 | | | | | 7 | 69.2 |
| (Blank) | 492 | 7.5 | | | | 7 | 72.8 |
| (1) | 500 | | 7.25 | 24.3 | 3.53:1 | 7 | 73.5 |
| (Blank) | 492 | 7.5 | | | | 3 | 72.4 |
| (2) | 500 | | 7.25 | 24.3 | 3.35:1 | 3 | 74.2 |

[1] Ml. of 30% $H_2O_2$. [2] Using 73% pure $CaO_2$. [3] Before immersing piece of wool cloth. [4] Of dry piece of wool cloth after bleaching.

The figures in Table I clearly illustrate the effectiveness of the composition of the present invention as a bleachant by the improvement in brightness obtained in the bleached cloth.

I claim:

1. A bleaching composition consisting essentially of potassium pyrosulfate and calcium peroxide wherein said pyrosulfate and peroxide are in a ratio to each other by weight such that when mixed together in water an aqueous bleaching mixture having a pH of from about 9.5 to about 1.0 is produced.

2. A bleaching composition consisting essentially of potassium pyrosulfate and calcium peroxide wherein the ratio of the weight of said pyrosulfate and that of the peroxide is such that when dissolved in water an aqueous acidic bleaching mixture having a pH within the range of from about 3.0 to about 1.0 is produced.

3. A bleaching composition consisting essentially of potassium pyrosulfate and calcium peroxide wherein the ratio of the weight of said pyrosulfate to that of said peroxide is from about 3.4 to about 3.5.

4. A bleaching composition consisting essentially of potassium pyrosulfate and calcium peroxide wherein the ratio of the weight of said pyrosulfate to that of said peroxide is within the range of from 3.5 to about 7.5.

References Cited by the Examiner

UNITED STATES PATENTS 850,606   4/1907   Schroeder et al. _____ 252—186

OTHER REFERENCES

"Becco," Bulletin No. 7, Alkaline Earth Metal Peroxide, Food Machinery and Chemical Corp., Buffalo, N.Y., page 3.

Merck Index, 6th edition, 1952, page 781.

JULIUS GREENWALD, *Primary Examiner.*

ALBERT T. MEYERS, *Examiner.*